(12) United States Patent
Wu et al.

(10) Patent No.: US 9,474,098 B2
(45) Date of Patent: Oct. 18, 2016

(54) METHOD, APPARATUS, AND SYSTEM FOR PROCESSING RADIO LINK FAILURE

(71) Applicant: CHINA ACADEMY OF TELECOMMUNICATIONS TECHNOLOGY, Beijing (CN)

(72) Inventors: Yumin Wu, Beijing (CN); Zhe Fu, Beijing (CN); Yali Zhao, Beijing (CN); Jing Liang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 14/418,575

(22) PCT Filed: Jul. 30, 2013

(86) PCT No.: PCT/CN2013/080447
§ 371 (c)(1),
(2) Date: Jan. 30, 2015

(87) PCT Pub. No.: WO2014/019504
PCT Pub. Date: Feb. 6, 2014

(65) Prior Publication Data
US 2015/0156810 A1 Jun. 4, 2015

(30) Foreign Application Priority Data

Jul. 31, 2012 (CN) .......................... 2012 1 0270437

(51) Int. Cl.
*H04W 76/02* (2009.01)
*H04W 24/04* (2009.01)
(Continued)

(52) U.S. Cl.
CPC .......... *H04W 76/027* (2013.01); *H04L 5/0035* (2013.01); *H04W 24/04* (2013.01); *H04W 16/32* (2013.01); *H04W 76/025* (2013.01)

(58) Field of Classification Search
CPC ............. H04W 24/04; H04W 76/027; H04W 76/025; H04W 16/32; H04L 5/0035
See application file for complete search history.

(56) References Cited

U.S. PATENT DOCUMENTS

| 2010/0124173 A1* | 5/2010 | Agashe ............. H04W 36/0083 370/245 |
| 2010/0124918 A1* | 5/2010 | Agashe ............. H04W 36/0083 455/423 |

(Continued)

FOREIGN PATENT DOCUMENTS

| CN | 101212775 A | 7/2008 |
| CN | 1017544419 A | 6/2010 |

(Continued)

OTHER PUBLICATIONS

3GPP: "3rd Generation Partnership Project; Technical Specification Group Radio Access Network; Evolved Universal Terrestrial Radio Access (E-UTRA); Radio Resource Control (RRC); Protocol specification (Release 11)", 3GPP Draft; 36331-880, 3rd Generation Partnership Project (3GPP), Mobile Competence Centre ; 658, Route Des Lucioles ; F-06921 Sophia-Antipolis Cedex , France, (2812-07-02), XP858601666, [retrieved on 2812-87-82].

(Continued)

*Primary Examiner* — Brian D Nguyen
(74) *Attorney, Agent, or Firm* — Kilpatrick Townsend & Stockton LLP (57) ABSTRACT

Disclosed are a method, an apparatus, and a system for processing a radio link failure (RLF), to provide an RLF processing solution in a scenario where a user equipment (UE) aggregates cell resources of multiple evolved Node Bs (eNBs). The method for processing an RLF provided in the present application comprises: in a scenario where a UE aggregates cell resources of multiple eNBs, a local eNB (LeNB) determining that an RLF occurs on the UE; and the LeNB stopping data transmission of a radio bearer (RB) related to the RLF, and notifying a Macro eNB of related information of the RLF.

14 Claims, 6 Drawing Sheets

An LeNB detects an RLF occurring with a UE in a scenario where cell resources of a plurality of eNB's are aggregated for the UE — S101

The LeNB stops data of related RB's of the RLF from being transmitted and notifies a macro eNB of information about the RLF — S102

(51) Int. Cl.
  *H04L 5/00* (2006.01)
  *H04W 16/32* (2009.01)

(56) References Cited

U.S. PATENT DOCUMENTS

| | | | |
|---|---|---|---|
| 2011/0188472 A1 | 8/2011 | Jeon et al. | |
| 2011/0294508 A1* | 12/2011 | Min | H04W 36/0083 455/436 |
| 2012/0087250 A1* | 4/2012 | Song | H04W 24/02 370/242 |
| 2012/0149362 A1* | 6/2012 | Tooher | H04W 24/10 455/423 |
| 2013/0003533 A1* | 1/2013 | Barbieri | H04W 36/06 370/225 |
| 2013/0084910 A1* | 4/2013 | Suzuki | H04W 24/02 455/515 |
| 2013/0242716 A1* | 9/2013 | Amerga | H04W 76/027 370/216 |

FOREIGN PATENT DOCUMENTS

| | | |
|---|---|---|
| CN | 102223658 A | 10/2011 |
| EP | 2234450 A2 | 9/2010 |
| WO | 2011/100673 A1 | 8/2011 |

OTHER PUBLICATIONS

The Extended European Search Report issued on Aug. 27, 2015 in the EP counterpart application (13825925.4).
International Search Report for PCT/CN2013/080447, mailed Nov. 7, 2013, 4 pages.

* cited by examiner

METHOD, APPARATUS, AND SYSTEM FOR PROCESSING RADIO LINK FAILURE

The present application is a U.S. National Stage of International Application No. PCT/CN2013/080447, filed Jul. 30, 2013, designating the United States, and claiming the benefit of Chinese Patent Application No. 201210270437.8, filed with the Chinese Patent Office on Jul. 31, 2012 and entitled "Method, device and system for handling radio link failure", which is hereby incorporated by reference in its entirety.

FIELD

The present invention relates to the field of communications and particularly to a method, device and system for handling a Radio Link Failure (RLF).

BACKGROUND

As an increasing number of femto cell, pico cells, relay nodes and other numerous local eNB's (LeNB's) have been deployed, the traditional network architecture where macro eNB's are predominant are evolving gradually into a network architecture, where more types of eNB's coexist, providing network coverage at more layers. In order to improve relevant performance in the network architecture where many types of eNB's coexist, the network architecture where evolved Node B's (eNB's) cooperate or are aggregated with each other has been proposed.

Figure 1:
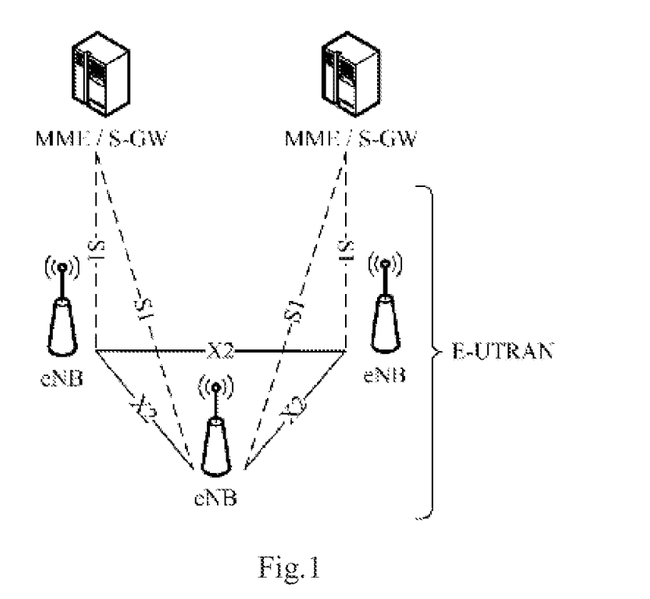
FIG. 1 illustrates a schematic architectural diagram of the E-UTRAN network in the prior art.

FIG. 1 illustrates the network architecture of a Long Term Evolution (LTE) system, wherein an Evolved Universal Terrestrial Radio Access Network (E-UTRAN) is consisted of eNB's. An eNB communicates with a User Equipment (UE) via an air interface. There are both a control plane connection and a user plane connection between the UE and the eNB. Each UE attached to the network is served by a Mobility Management Entity (MME) connected with the eNB via an S1-MME interface. The S1-MME interface provides the UE with a control plane service.

A Serving Gateway (S-GW) is connected with the eNB via an S1-U interface, and each UE is served by a corresponding S-GW. The S1-U interface providing the LIE with a user plane service. User plane data of the UE is carried via the S1-U interface and transmitted between the S-GW and the eNB.

Figure 2:
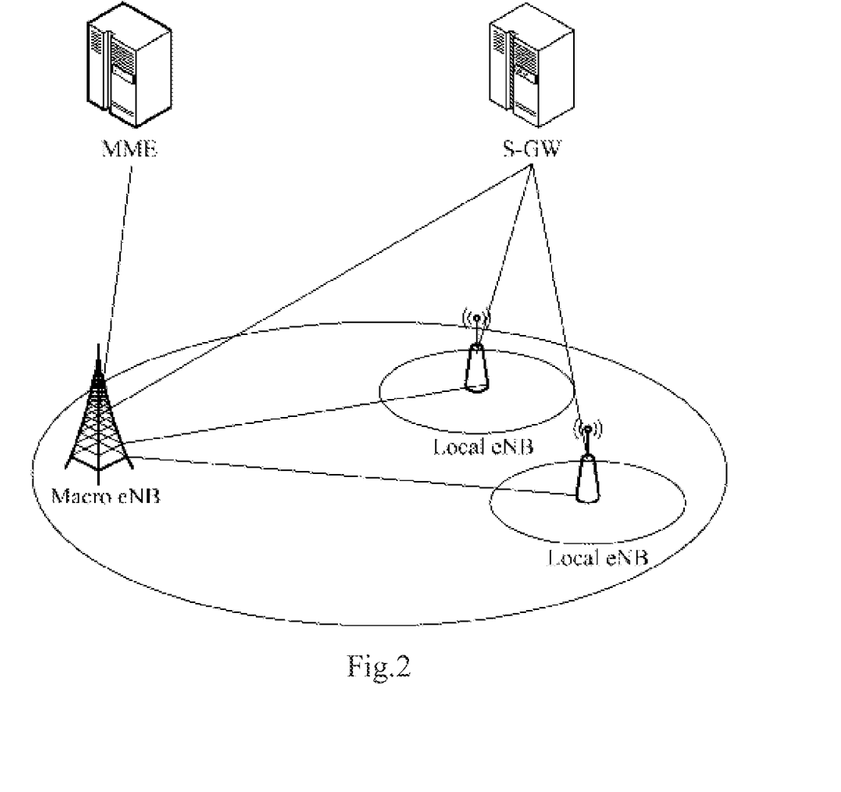
FIG. 2 illustrates a schematic architectural diagram of the network scenario with layered coverage in the prior art.

In the scenario where a layered network including a local eNB and a macro eNB is deployed, e.g., a possible layered network coverage environment illustrated in FIG. 2, the macro eNB can provide underlying coverage, and the local eNB can provide hotspot coverage; there is a high-speed data/signaling interface (wired or radio interface) between the local eNB and the macro eNB; and the UE can operate while being served by the macro eNB or the local eNB. When the UE connected with the macro eNB enters a coverage area of a cell corresponding to the local eNB, a part or all of data/signaling of the UR can be transferred to the local eNB, for a service available from the local eNB, taking into account a signal strength, load balancing, etc., so that the UE can access resources of both the macro eNB and the local eNB, and inter-eNB aggregation can be performed. In this scenario, multiple Radio Bearers (RB's) of the UE can be carried respectively by a macro cell controlled by the macro eNB and a local cell controlled by the local eNB, where the RB's can include a Data Radio Bearer (DRB) and a Signal Radio Bearer (SRB).

In the existing protocol, the eNB generally detects a Radio Link Failure (RLF) in the following two schemes:

In a first scheme, the eNB judges from RLF information reported by the UE whether there is an RLF occurring with the UE served by some cell; and In a second scheme, the eNB judges by itself whether there is an RLF occurring with the UE served by some cell.

In the first scheme, the UE determines that an RLF is detected upon detecting any one of the following situations occurring and subsequently reports it to the eNB:

(1) The timer T310 expires;

(2) A random access failure indicator of the media Access Control (MAC) layer is received; and (3) An indicator of the Radio Link Control (RLC) layer, that the largest number of retransmissions has been reached, is received.

At this time, if security of the access layer has not been activated, then the UE releases a Radio Resource Control (RRC) connection and enters the RRC_IDLE state; otherwise, the UE initiates an RRC connection reestablishment procedure.

For (1), the UE detects whether there is a problem occurring with an air interface radio link by judging it against two constants N310 and N311 and the timer T310. When the UE is in the RRC_CONNECTED state, the physical layer keeps on measuring a downlink channel quality of the serving cell and transmits an "Out-of-Sync" indicator to the RRC layer upon detecting the channel quality being below some threshold or an "In-Sync" indicator to the RRC layer upon detecting the channel quality being above a threshold. When a number N310 of consecutive "Out-of-Sync" indicators have been received and none of timers T300, T301, T304 and T311 has been started, the RRC layer of the UE judges that, there is a problem temporarily occurring with the radio link quality at that time and starts the timer T310 configured to control the longest allowable period of time for the radio link quality to resume. When a number N311 of consecutive "In-Sync" indicators have been received and the timer T310 has been started, the RRC layer of the UE judges that the radio link quality has been resumed and stops the timer T310. The UE judges that there is an RLF occurring when the T310 expires.

For (2), if the MAC layer of the UE judges that the random access procedure of the UE fails, the MAC layer will indicate a random access failure accordingly. The UE determines that a radio link failure occurs therewith from the random access failure indicator from the MAC layer thereof.

For (3), if the RLC layer of the UE judges that a data packet transmitted by the UE reaches the largest number of retransmissions, the RLC layer will indicate that the largest number of retransmissions is reached. The UE determines that a radio link failure occurs therewith from the indicator from the RLC layer thereof that the largest number of retransmissions is reached.

In the second scheme, the eNB can judge by itself whether there is an RLF occurring with the UE served by some cell, for example, upon some timer expiring, from the largest number of times that some data packet is retransmitted, etc.

In summary, an RLF detected by the eNB itself typically relates to handling of RLF occurring in the same eNB cell in the existing protocol, but an action and cooperation mechanism of the macro eNB and the local eNB in the scenario where a plurality of eNB's cooperate/are aggregated (e.g., inter-eNB aggregated, etc.) has been absent. Thus it is necessary to be concerned with how the eNB handles an RLF upon detecting the RLF by itself in the network scenario with layered coverage illustrated in FIG. 2.

SUMMARY

Embodiments of the invention provide a method, device and system for handling an RLF so as to offer a solution to handling an RLF in a scenario where cell resources of a plurality eNB's are aggregated for a UE.

An embodiment of the invention provides a method for handling an RLF in a scenario where cell resources of a plurality of eNB's are aggregated for UE, the method including:

detecting, by an LeNB, RLF occurring with the UE; and stopping, by the LeNB, data of related RB's of the RLF from being transmitted and notifying a macro eNB of information about the RLF.

An embodiment of the invention provides a method for handling an RLF in a scenario where cell resources of a plurality of eNB's are aggregated for UE, the method including:

receiving, by a macro eNB, information about an REF notified by an LeNB; and judging, by the macro eNB, from the information about the RLF whether one or any combination of operations of releasing, remerging and re-separating related RB's of the UE with the RLF occurring will be performed subsequently.

An embodiment of the invention provides a device for handling an RLF, the device including:

a detecting component configured to detect an RLF occurring with a UE in a scenario wherein cell resources of a plurality of eNB's are aggregated for the UE; and a handling component configured to stop data of related RB's of the RLF from being transmitted and to notify a macro eNB of information about the RLF.

An embodiment of the invention provides a device for handling an RLF, the device including:

a receiving component configured to receive information about an RLF notified by a Local evolved Node B (LeNB) in a scenario wherein cell resources of a plurality of eNB's are aggregated for a UE; and a handling component configured to judge from the information about the RLF whether one or any combination of operations of releasing, remerging and re-separating related RB's of the UE with the RLF occurring will be performed subsequently.

With the embodiments of the invention, in the scenario where cell resources of a plurality of eNB's are aggregated for the UE, the LeNB detects an REF occurring with the UE, and the LeNB stops data of related RB's of the RLF from being transmitted and notifies the macro eNB of information about the RLF, thus offering a solution to handling an RLF at the LeNB side in the scenario where cell resources of a plurality of eNB's are aggregated for the UE; and Correspondingly, in the scenario where cell resources of a plurality of eNB's are aggregated for the UE, the macro eNB receives the information about the RLF notified by the LeNB; and the macro eNB judges from the information about the RLF whether one or any combination of operations of releasing, remerging and re-separating the related RB's of the UE with the RLF occurring will be performed subsequently, thus offering a solution to handling an RLF at the macro eNB side in the scenario where cell resources of a plurality of eNB's are aggregated for the UE.

DETAILED DESCRIPTION

Embodiments of the invention provide a method, device and system for handling an RLF so as to offer handling of an RLF in a scenario where cell resources of a plurality of eNB's aggregated for a UE.

An embodiment of the invention provides a method for handling an RLF occurring in a cell served by a local eNB for the network architecture with inter-eNB aggregation.

Figure 3:
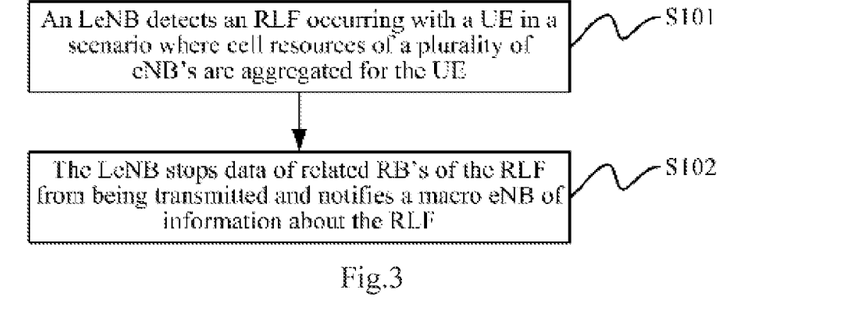
FIG. 3 illustrates a schematic flow chart of a method for handling an RLF at the LeNB side according to an embodiment of the invention.

Referring to FIG. 3, a method for handling an RLF at the LeNB side according to an embodiment of the invention includes:

S101. An LeNB detects an RLF occurring with a UE in a scenario where cell resources of a plurality of eNB's are aggregated for the UE.

S102. The LeNB stops data of related RB's of the RLF from being transmitted and notifies a macro eNB of information about the RLF.

Preferably the information about the RLF includes at least the identifier of the UE with the RLF occurring.

Preferably the information about the RLF further includes:

Information about an RB with the RLF occurring; and/or

Information about the other RB's than the RB with the RLF occurring, where the other RB's and the RB with the RLF occurring are RB's serving the same UE.

Preferably the LeNB stops the data of the related RB's of the RLF from being transmitted as follows:

The LeNB stops data of all the RB's corresponding to the UE with the RLF occurring from being transmitted; or The LeNB stops data of an RB with the RLF occurring thereon from being transmitted.

Figure 4:
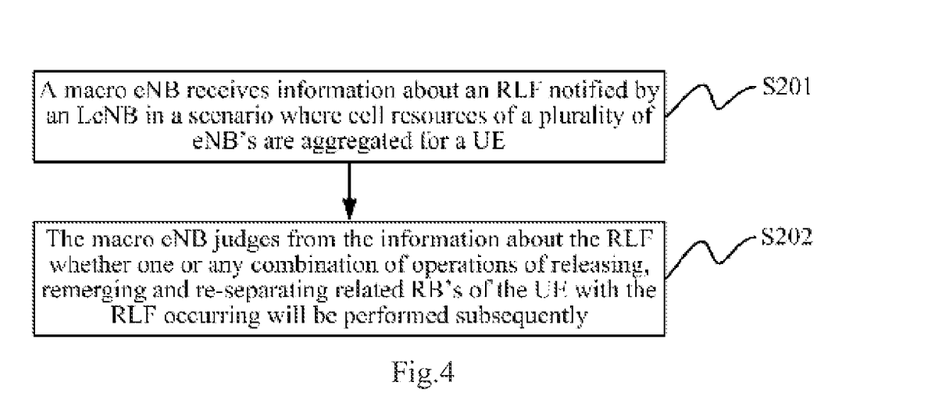
FIG. 4 illustrates a schematic flow chart of a method for handling an RLF at the macro eNB side according to an embodiment of the invention.

Correspondingly referring to FIG. 4, an embodiment of the invention provides a method for handling an RLF at the macro eNB side, the method including:

S201. A macro eNB receives information about an RLF notified by an LeNB in a scenario where cell resources of a plurality of eNB's are aggregated for a UE; and S202. The macro eNB judges from the information about the RLF whether one or any combination of operations of releasing, remerging and re-separating related RB's of the UE with the RLF occurring will be performed subsequently.

Preferably the related RB's of the UE with the RLF occurring are released as follows:

The macro eNB transmits an RB release command respectively to the UE and the local eNB.

Preferably the related RB's of the UE with the RLF occurring are remerged as follows:

The macro eNB transmits an RB remerge command to the UE to instruct the UE to reestablish an RB on the macro eNB.

Preferably the related RB's of the UE with the RLF occurring are re-separated as follows:

Upon reception of a notification transmitted from a first local eNB that there is an RLF occurring, the macro eNB determines from a measurement result reported by the UE that a second local eNB is available and transmits a bearer separation request to the second local eNB; and The macro eNB receives a notification of an RB which can be admitted by the second local eNB and configures the UE with the RB which can be admitted, and the macro eNB transmits an RB release command respectively to the first local eNB and the UE.

Stated otherwise, handling of an RLF can include handling of the RLF by the macro eNB itself and handling of the RLF by the macro eNB negotiating with adjacent LeNB's.

The RLF is handled by the macro eNB itself (primarily for an RB to be released or remerged) as follows:

A radio link failure of a local cell is handled as follows in the network scenario with layered coverage in support of eNB aggregation:

The local eNB judges whether an RLF condition is satisfied dependent upon an implementation; and The local eNB transmits an RLF report and other information to the macro eNB.

The macro eNB judges from a current measurement result, network bearers and other conditions whether to initiate an RB release or remerge procedure.

The macro eNB initiates the RB release procedure and transmits an RB release command to the local eNB.

The macro eNB initiates the RB release procedure and transmits the RB release command to the UE.

The macro NB initiates the RB remerge procedure and transmits an RB remerge command to the UE.

The UE reestablishes related RB's on the macro eNB in response to the RB remerge command.

The RLF is handled by the macro eNB negotiating with the adjacent LeNB's (primarily for an RB to be released or re-separated) as follows:

A radio link failure of a local cell is handled as follows in the network scenario with layered coverage in support of eNB aggregation:

The local eNB judges whether an RLF condition is satisfied dependent upon an implementation; and The local eNB transmits an RLF report and other information to the macro eNB.

The macro eNB determines, from a measurement report made by the UE, the RLF report and other information, or admission decision feedback information of the adjacent LeNB's, adjacent LeNB's available for a bearer to be established and transmits a bearer setup request to the adjacent LeNB's.

The adjacent LeNB's make an admission decision according to their own load conditions and other information, and transmits bearer setup feedback information to the macro eNB.

The macro eNB judges, from the bearer setup feedback information of the adjacent LeNB's, the current measurement result of the UE, a network load and other conditions, whether to initiate an RB release or re-separation procedure. In response to results of the LeNB's to admit the RB's to be established, the macro eNB can reinitiate an RB setup request to the other adjacent LeNB's for RB's which are not admitted.

The macro eNB initiates the RB release procedure and transmits an RB release command to the local eNB.

The macro eNB initiates the RB release procedure and transmits the RB release command to the UE.

The macro NB transmits an RB re-separation command to the UE.

The UE creates RB re-separation related lower-layer entities, transmits acknowledgement information to the macro eNB and initiates a bearer setup procedure on the adjacent LeNB's.

Preferably the information about the RLF includes at least the identifier of the UE with the RLF occurring.

Preferably the information about the RLF further includes:

Information about an RB with the RLF occurring; and/or

Information about the other RB's than the RB with the RLF occurring, ere the other RB's and the RB with the RLF occurring are RB's serving the same UE.

As can be apparent, in the invention, the LeNB detects by itself an RLF occurring with the UE. The LeNB stops data of related RB's with the RLF occurring from being transmitted and reports an RLF report and related assistance information to the macro eNB. The macro eNB can judge whether the related RB's of the UE of the UE with the RLF occurring will be released, remerged or re-separated subsequently after collecting the related information assisting in handling the RLF. RB's can be released in such a way that the macro eNB instructs an RB related resource at the UE side with the RLF occurring to be released/de-configured/deactivated, etc., and the macro eNB instructs a related resource at the eNB side with the RLF occurring to be released. RB's can be remerged by reestablishing the related RB's on the macro eNB. An RB(s) can be re-separated by establishing the related RB's on the adjacent LeNB's.

Particular embodiments of the invention will be described as follows:

In a first embodiment, a macro eNB handles by itself an unsuccessfully separated RB (where an RB will be released or an RB will be remerged).

It is assumed that resources of only two eNB's, which are a macro eNB and a local eNB respectively, are aggregated for a UE, where the macro eNB initiates separation of a bearer, and an REF occurs on the separated bearer on the local eNB.

A general flow of handling an RLF includes:

In the first operation, the local eNB detects an RLF occurring with some UE from which a bearer is separated and notifies the macro eNB; and The local eNB stops data of the UE with the RLF occurring from being transmitted upon detecting by itself the RLF of the UE in a particular implementation. Data of RB's can be stopped from being transmitted in the following several schemes:

In a first scheme, the LeNB stops transmission over all the RB's corresponding to the UE with the RLF occurring thereon.

In a second scheme, the LeNB stops transmission over the RB's with the RLF occurring thereon with the UE.

When or after the LeNB stops data of the RB's corresponding to the UE with the RLF occurring from being transmitted, the local eNB instructs the macro eNB via an inter-eNB interface to perform a subsequent process for the UE with the RLF occurring, there an instruction message includes:

The identifier of the UE with the RLF occurring; and

Optionally the message can further include information about the RB, established on the local eNB, with the RLF occurring; and Optionally the message can further include information about the other related RB's of the UE with the RLF occurring.

In the second operation, the macro eNB handles the RLF;

The macro eNB performs admission control on the RB separated to the local eNB upon reception of the RLF and other information transmitted by the local eNB.

Figure 5:
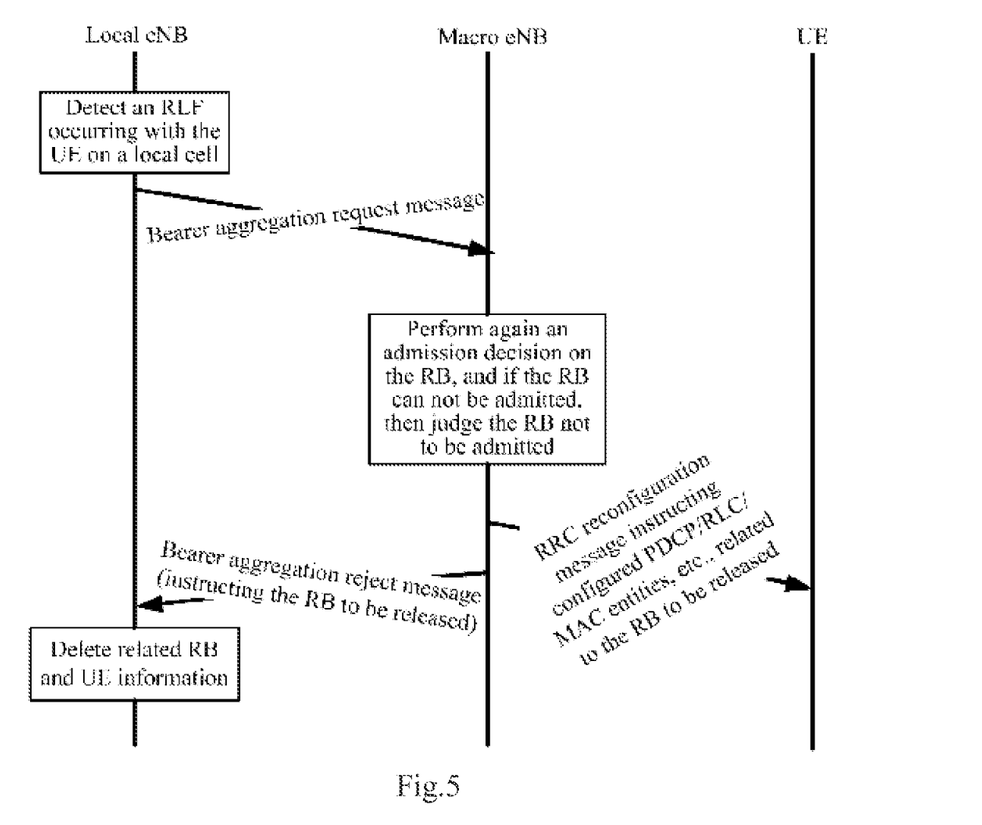
FIG. 5 illustrates a schematic flow chart of a separated RB being released by a macro eNB according to an embodiment of the invention.
Figure 6:
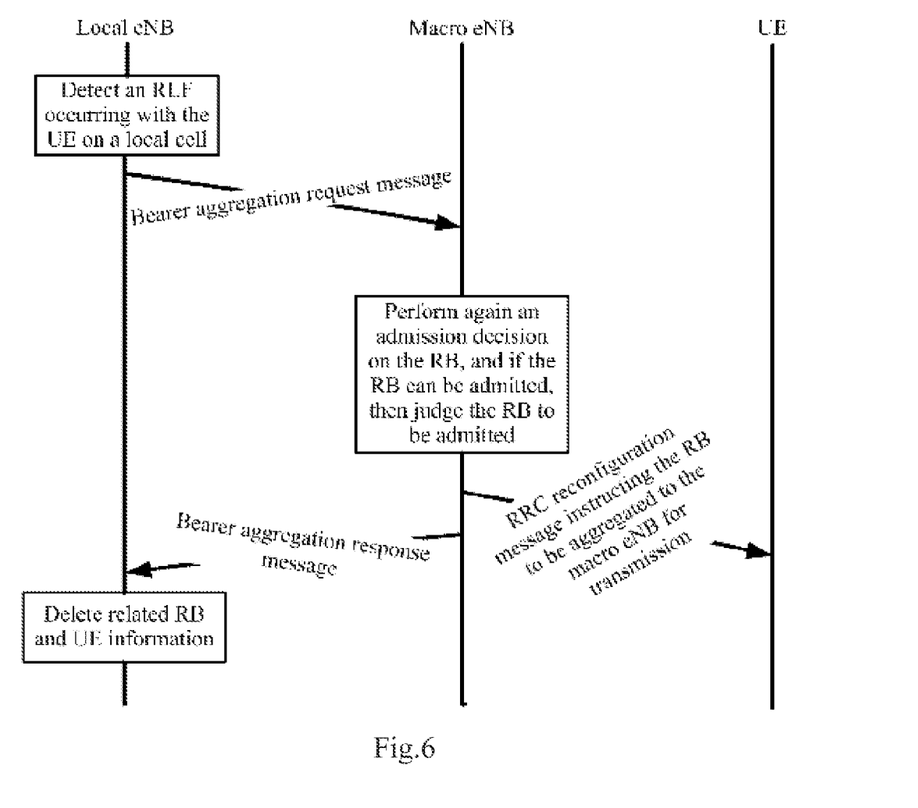
FIG. 6 illustrates a schematic flow chart of a separated RB being readmitted/remerged by a macro eNB according to an embodiment of the invention.

Referring to FIG. 5, if it is determined that the RB can not be admitted, then the macro eNB instructs the UE and the local eNB to release the RB; and Referring to FIG. 6, if it is determined that the RB can be admitted, then the macro eNB instructs the UE in RRC reconfiguration signaling to create Packet Data. Convergence Protocol (PDCP)/RLC entities corresponding to the RB, and the correspondence relationship between the PDCP/RLC entities and an MAC entity, in entities corresponding to the macro eNB and releases PDCP/RLC and MAC entities at the UE side corresponding to the local eNB. In the meantime the macro eNB needs to instruct the local eNB via an interface between the macro and local eNB's to release the configuration related to the UE or the RB. The local eNB responds to the macro eNB with a response message at the end of the flow.

Data can be forwarded in an RB (re)merging procedure as in a procedure of forwarding data in a non-RB separation scenario.

In a second embodiment, a macro eNB requests another node for handling an RLF (where an RB is re-separated).

Figure 7:
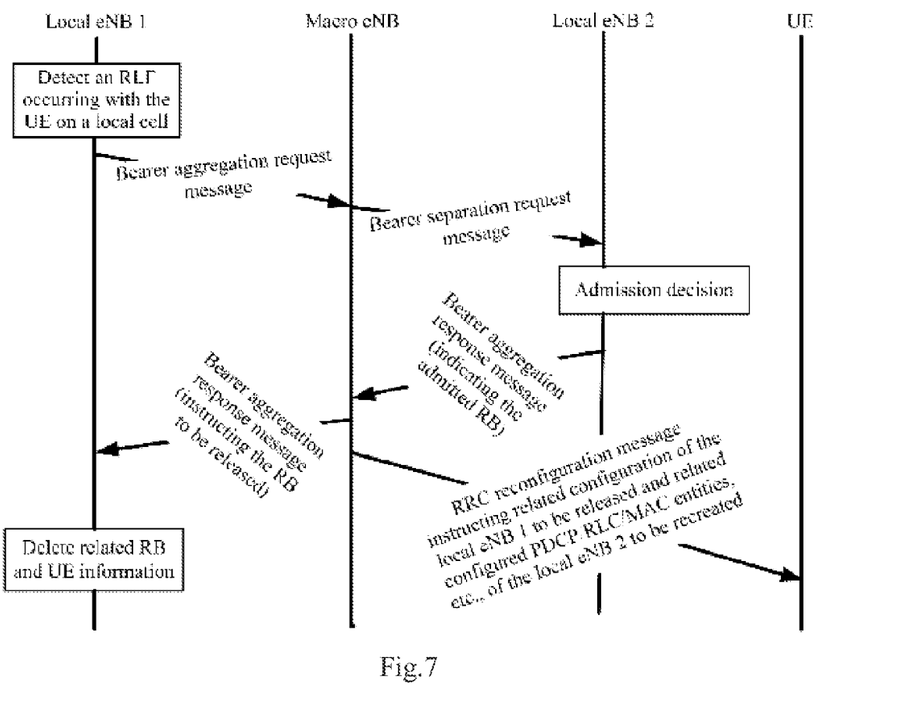
FIG. 7 illustrates a schematic flow chart of a separated RB being re-separated by a macro eNB according to an embodiment of the invention.

Referring to FIG. 7, it is assumed that a UE is located in an area covered by a plurality of local eNB's and a current bearer separated to the local eNB 1 is re-separated to the local eNB 2 after there is an RLF occurring.

A general flow of handling an RLF includes:

In the first operation, the local eNB 1 detects an RLF occurring with some UE from which a bearer is separated and notifies the macro eNB; and The local eNB stops data of the UE with the RLF occurring from being transmitted upon detecting by itself the RLF of the UE in some implementation. Data of RB's can be stopped from being transmitted in the following several schemes:

In a first scheme, the local eNB 1 stops transmission over all the RB's corresponding to the UE with the RLF occurring thereon.

In a second scheme, the local eNB 1 stops transmission over the RB's with the RLF occurring thereon with the UE.

When or after the local eNB 1 stops data of the RB's corresponding to the UE with the RLF occurring from being transmitted, the local eNB 1 instructs the macro eNB via an inter-eNB interface to perform a subsequent process for the UE with the RLF occurring, where an instruction message includes:

The identifier of the UE with the RLF occurring; and

Optionally the message can further include information about the RB, established on the local eNB, with the RLF occurring; and Optionally the message can further include information about the other related RB's of the UE with the RLF occurring.

In the second operation, the macro eNB handles the RLF of the UE served by the local eNB 1;

If the macro eNB determines from a measurement result reported by the UE that there are local eNB's 2 available upon reception of the RLF and other information transmitted by the local eNB 1, then the macro eNB transmits a bearer separation request to the plurality of local eNB's 2 via interfaces between the macro eNB and the local eNB's 2 for results of the respective local eNB's 2 to admit the separated RB.

In the operation 3, the local eNB 2 assists the macro eNB in handling e RLF of the UE served by the local eNB 1;

The local eNB makes an admission decision and notifies the macro eNB of the RB which can be admitted, the macro eNB configures the UE with the RB which can be admitted by the local eNB 2 in RRC reconfiguration, and the UE releases configured PDCP/RLC/MAC entities related to the local eNB 1; and also recreates PDCP/RLC/MAC entities of the RB related to the local eNB 2 and the correspondence between the PDCP/RLC and MAC entities.

In the meantime the macro eNB needs to instruct the local eNB 1 to release configuration information related to the RB and the UE.

Data can be forwarded in an RB (re-)separation procedure as in a procedure of forwarding data in a non-RB separation scenario.

It shall be noted that in addition to this implementation, the macro eNB can re-separate directly the RB of the UE with the RLF as described in the second embodiment above, the operation can also be enforced in any of the following four implementations, and since their flows are similar to the second embodiment, so they will not be described respectively but outlined below with respect to their ideas.

In a first implementation, the macro eNB firstly admits and then re-separates the bearers separated thereto.

In a second implementation, the macro eNB firstly admits the bearers separated thereto and then re-separates only such a part of the RB's that can not be admitted.

In a third implementation, if the local eNB's are RRC capable, then the RB can be transferred from one local eNB directly to another local eNB and the macro eNB can be notified if the transfer is successful.

In a fourth implementation, if the local eNB notifies the macro eNB that the RB the RLF occurring can be recreated, then the macro eNB will not renegotiate with the local eNB about an admission decision but recreate the RB directly on the local eNB.

Figure 8A:
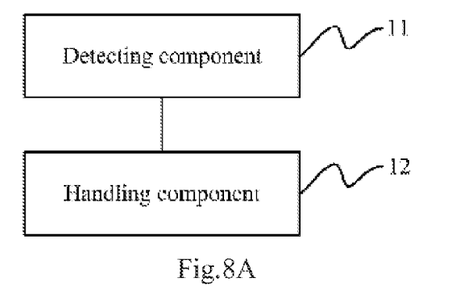
FIG. 8A illustrates a schematic functionally-structural diagram of a device for handling an RLF at the LeNB side according to an embodiment of the invention.

Referring to FIG. 8A, an embodiment of the invention provides a device for handling an RLF at the LeNB side, the device including:

A detecting component 11 is configured to detect an RLF occurring with a UE in a scenario where cell resources of a plurality of eNB's are aggregated for the UE; and A handling component 12, is configured to stop data of related RB's of the RLF from being transmitted and to notify a macro eNB of information about the RLF.

Preferably the information about the RLF includes at least the identifier of the UE with the RLF occurring.

Preferably the information about the RLF further includes:

Information about an RB with the RLF occurring; and/or

Information about the other RB's than the RB with the RLF occurring, where the other RB's and the RB with the RLF occurring are RB's serving the same UE.

Preferably the handling component 12 configured to stop the data of the related RB's of the RLF from being transmitted is configured:

To stop data of all the RB's corresponding to the UE with the RLF occurring from being transmitted; or To stop data of an RB with the RLF occurring thereon from being transmitted.

Figure 8B:
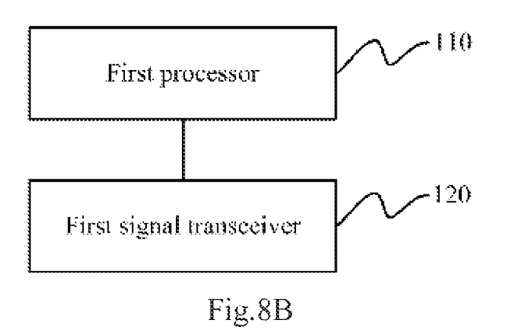
FIG. 8B illustrates a schematic physically-structural diagram of an LeNB according to an embodiment of the invention.

Particularly in hardware, the detecting component 11 can be a processor, and the handling component 12 can be a signal transceiver including transmit and receive antennas, etc., and at this time, as illustrated in FIG. 8B, an LeNB according to an embodiment of the invention includes:

A first processor 110 is configured to detect an RLF occurring with a UE in a scenario where cell resources of a plurality of eNB's are aggregated for the UE; and A first signal transceiver 120 is configured to stop data of related RB's of the RLF from being transmitted and to notify a macro eNB of information about the RLF.

Preferably the information about the RLF includes at least the identifier of the UE with the RLF occurring.

Preferably the information about the RLF further includes:

Information about an RB with the RLF occurring; and/or

Information about the other RB's than the RB with the RLF occurring, where the other RB's and the RB with the RLF occurring are RB's serving the same UE.

Preferably the first signal transceiver 120 configured to stop the data of the related RB's of the RLF from being transmitted is configured:

To stop data of all the RB's corresponding to the UE with the RLF occurring from being transmitted; or To stop data of an RB with the RLF occurring thereon from being transmitted.

Figure 9A:
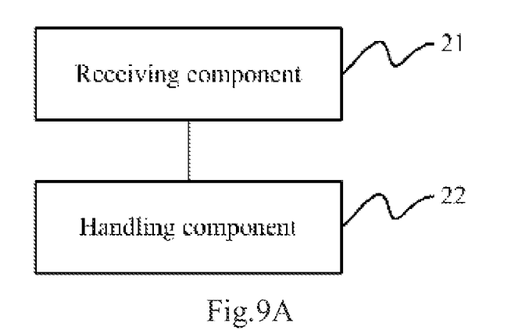
FIG. 9A illustrates a schematic functionally-structural diagram of a device for handling an RLF at the macro eNB side according to an embodiment of the invention.

Correspondingly, referring to FIG. 9A, an embodiment of the invention provides a device for handling an RLF at the macro eNB side, the device including:

A receiving component 21 is configured to receive information about RLF notified by an LeNB in a scenario where cell resources of a plurality of eNB's are aggregated for a UE; and A handling component 22 is configured to judge from the information about the RLF Whether one or any combination of operations of releasing, remerging and re-separating related RB's of the UE with the RLF occurring will be performed subsequently.

Preferably the information about the RLF includes at least the identifier of the UE with the RLF occurring.

Preferably the information about the RLF further includes:

Information about an RB with the RLF occurring; and/or

Information about the other RB's than the RB with the RLF occurring, where the other RB's and the RB with the RLF occurring are RB's serving the same UE.

Preferably the handling component 22 configured to release the related RB's of the UE with the RLF occurring is configured:

To transmit an RB release command respectively to the UE and the local eNB.

Preferably the handling component 22 configured to remerge the related RB's of the UE with the RLF occurring is configured:

To transmit an RB remerge command to the UE to instruct the UE to reestablish an RB on the macro eNB.

Preferably the handling component 22 configured to release the related RB's of the UE with the RLF occurring is configured:

Upon reception of a notification transmitted from a first local eNB that there is an RLF occurring, to determine from a measurement result reported by the UE that a second local eNB is available and to transmit a bearer separation request to the second local eNB; and To receive a notification of an RB which can be admitted by the second local eNB and to configure the UE with the RB which can be admitted, and to transmit an RB release command respectively to the first local eNB and the UE.

Figure 9B:
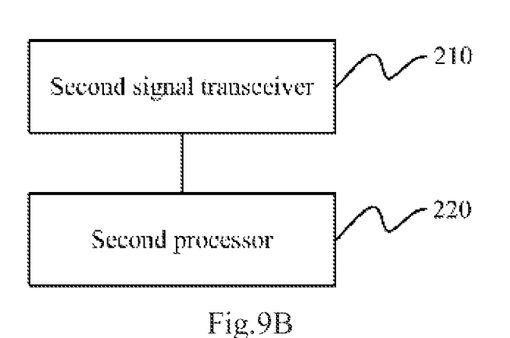
FIG. 9B illustrates a schematic physically-structural diagram of a macro eNB according to an embodiment of the invention.

Particularly in hardware, the receiving component 21 can be a signal transceiver including transmit and receive antennas, etc., and the handling component 22 can be a signal transceiver including a processor, transmit and receive antennas, etc., and at this time, as illustrated in FIG. 9B, a macro eNB according to an embodiment of the invention includes:

A second signal transceiver 210 is configured to receive information about an RLF notified by an LeNB in a scenario where cell resources of a plurality of eNB's are aggregated for a UE; and A second processor 220 is configured to judge from the information about the RLF whether one or any combination of operations of releasing, remerging and re-separating related RB's of the UE with the RLF occurring will be performed subsequently.

Preferably the information about the RLF includes at least the identifier of the UE with the RLF occurring.

Preferably the information about the RLF further includes:

Information about an RB with the RLF occurring; and/or

Information about the other RB's than the RB with the RLF occurring, where the other RB's and the RB with the RLF occurring are RB's serving the same UE.

Preferably the second signal transceiver 210 is further configured to transmit an RB release command respectively to the UE and the local eNB when the second processor 220 judges the related RB's of the UE with the RLF occurring to be released.

Preferably the second signal transceiver 210 is further configured to transmit an RB remerge command to the UE to instruct the UE to reestablish an RB on the macro eNB when the second processor 220 judges the related RB's of the UE with the RLF occurring to be remerged.

Preferably when the second processor 220 judges the related RB's of the UE with the RLF occurring o be re-separated, the second signal transceiver 210 is further configured, upon reception of a notification transmitted from a first local eNB that there is an RLF occurring, to determine from a measurement result reported by the UR that a second local eNB is available and to transmit a bearer separation request to the second local eNB; and To receive a notification of an RB which can be admitted by the second local eNB and to configure the UE with the RB which can be admitted, and to transmit an RB release command respectively to the first local eNB and the UE.

As can be apparent, an embodiment of the invention provides a system for handling an RLF, the system including:

An LeNB configured to detect an RLF occurring with a UE in a scenario where cell resources of a plurality of eNB's are aggregated for the UE; and to stop data of related RB's of the RlF from being transmitted and to notify a macro eNB of information about the RLF; and The macro eNB is configured to receive the information about the RLF notified by then LeNB; and to judge from the information about the RLF whether one or any combination of operations of releasing, remerging and re-separating related RB's of the UE with the RLF occurring will be performed subsequently.

In summary, the invention offers a method for handling a radio link failure in a network scenario with layered coverage where a plurality of eNB's cooperate/are aggregated, where a local eNB reports an RLF and other information to a macro eNB, and the macro eNB decides on and notifies the local eNB of a subsequent process, thus better guaranteeing a quality of service of a user and coordinating the eNB's to address the RLF rapidly and effectively.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process no that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to t invention without departing from the spirit and scope of the invention. Thus the invention is also intended to encompass these modifications and variations thereto so long as the modifications and variations come into the scope of the claims appended to the invention and their equivalents.

The invention claimed is:

1. A method for handling a Radio Link Failure (RLF) in a scenario where cell resources of a plurality of evolved Node B's (eNB's) are aggregated for a User Equipment (UE), the method comprising:
   detecting, by a serving Local eNB (LeNB), an RLF occurring with the UE; and
   stopping, by the serving LeNB, data of related Radio Bearers (RB's) of the RLF from being transmitted between the serving LeNB and the UE and notifying a macro eNB of information about the RLF.

2. The method of claim 1, wherein the information about the RLF comprises at least an identifier of the UE with the RLF occurring.

3. The method of claim 2, wherein the information about the RLF further comprises:
   information about an RB with the RLF occurring; and/or
   information about the other RB's than the RB with the RLF occurring, wherein the other RB's and the RB with the RLF occurring are RB's serving the same UE.

4. The method of claim 1, wherein stopping, by the serving LeNB, the data of the related RB's of the RLF from being transmitted comprises:
   stopping, by the serving LeNB, data of all the RB's corresponding to the UE with the RLF occurring from being transmitted; or
   stopping, by the serving LeNB, data of an RB with the RLF occurring thereon from being transmitted.

5. A method for handling a Radio Link Failure (RLF) in a scenario where cell resources of a plurality of evolved Node B's (eNB's) are aggregated for a User Equipment (UE) , the method comprising:
   receiving, by a macro eNB, information about an RLF notified by a serving Local eNB (LeNB), after the RLF is detected by the serving LeNB; and
   judging, by the macro eNB, from the information about the RLF whether one or any combination of operations of releasing, remerging and re-separating related Radio Bearers (RB's) of the UE with the RLF occurring will be performed subsequently.

6. The method of claim 5, wherein the information about the RLF comprises at least an identifier of the UE with the RLF occurring.

7. The method of claim 6, wherein the information about the RLF further comprises:
   information about an RB with the RLF occurring; and/or
   information about the other RB's than the RB with the RLF occurring, wherein the other RB's and the RB with the RLF occurring are RB's serving the same UE.

8. The method of claim 5, wherein releasing the related RB's of the UE with the RLF occurring comprises:
   transmitting, by the macro eNB, an RB release command respectively to the UE and the serving LeNB.

9. The method of claim 5, wherein remerging the related RB's of the UE with the RLF occurring comprises:
   transmitting, by the macro eNB, an RB remerge command to the UE to instruct the UE to reestablish an RB on the macro eNB.

10. The method of claim 5, wherein re-separating the related RB's of the UE with the RLF occurring comprises:

upon reception of a notification transmitted from a first serving local eNB that there is an RLF occurring, determining, by the macro eNB, from a measurement result reported by the UE that a second local eNB is available and transmitting a bearer separation request to the second local eNB; and receiving, by the macro eNB, a notification of an RB which can be admitted by the second local eNB and configuring the UE with the RB which can be admitted, and transmitting, by the macro eNB, an RB release command respectively to the first local eNB and the UE.

11. A device for handling a Radio Link Failure (RLF), at a serving Local eNB (LeNB) side, the device comprising:
   a first processor configured to detect an RLF occurring with a UE in a scenario where cell resources of a plurality of eNB's are aggregated for the UE; and
   a first signal transceiver configured to stop data of related related Radio Bearers (RB's) of the RLF from being transmitted between the serving LeNB and the UE and to notify a macro eNB of information about the RLF.

12. The device of claim 11, wherein the information about the RLF comprises at least an identifier of the UE with the RLF occurring.

13. The device of claim 12, wherein the information about the RLF further comprises:
   information about an RB with the RLF occurring; and/or
   information about the other RB's than the RB with the RLF occurring, wherein the other RB's and the RB with the RLF occurring are RB's serving the same UE.

14. The device of claim 11, wherein the first signal transceiver configured to stop the data of the related RB's of the RLF from being transmitted is configured:
   to stop data of all the RB's corresponding to the UE with the RLF occurring from being transmitted; or
   to stop data of an RB with the RLF occurring thereon from being transmitted.

* * * * *